US010960492B2

United States Patent
Behr et al.

(10) Patent No.: US 10,960,492 B2
(45) Date of Patent: Mar. 30, 2021

(54) BEAM WELDING METHOD WITH GEOMETRIC FIXING BY A FILM

(71) Applicant: FORSCHUNGSZENTRUM JUELICH GMBH, Juelich (DE)

(72) Inventors: Wilfried Behr, Euskrichen (DE); Dietrich Faidel, Aachen (DE)

(73) Assignee: Forschungszentrum Juelich GmbH

( * ) Notice: Subject to any disclaimer, the term of this patent is extended or adjusted under 35 U.S.C. 154(b) by 734 days.

(21) Appl. No.: 15/316,357

(22) PCT Filed: May 15, 2015

(86) PCT No.: PCT/DE2015/000244
§ 371 (c)(1),
(2) Date: Dec. 6, 2016

(87) PCT Pub. No.: WO2015/188800
PCT Pub. Date: Dec. 17, 2015

(65) Prior Publication Data
US 2017/0189994 A1    Jul. 6, 2017

(30) Foreign Application Priority Data

Jun. 13, 2014  (DE) .................... 10 2014 008 660.7

(51) Int. Cl.
*B23K 26/20* (2014.01)
*B23K 37/04* (2006.01)
(Continued)

(52) U.S. Cl.
CPC .......... *B23K 26/206* (2013.01); *B23K 26/009* (2013.01); *B23K 26/244* (2015.10);
(Continued)

(58) Field of Classification Search
CPC ............ B23K 2103/10; B23K 2103/14; B23K 26/009; B23K 26/206; B23K 26/244; B23K 37/04; F16B 11/006; F16B 5/08
(Continued)

(56) References Cited

U.S. PATENT DOCUMENTS 3,365,566 A    1/1968  Kuder
6,822,205 B2*  11/2004  Rahn .................... B29D 23/001
                                                            219/609

(Continued)

FOREIGN PATENT DOCUMENTS

DE    1 565 637       5/1970
DE    4404492    *   6/1995
(Continued)

OTHER PUBLICATIONS

Reisgen et al., "Application of Pressure-Sensitive Adhesive Systems in Laser-Beam Welding of Lap Joints," Published in 2009.*
(Continued)

*Primary Examiner* — Geoffrey S Evans
(74) *Attorney, Agent, or Firm* — Jordan and Koda, PLLC

(57) ABSTRACT

A method for the gap-free joining of two workpieces is provided. The method comprises the following steps: a. the workpieces to be joined are brought into contact with one another so that a joining point is formed, b. the joining point is geometrically fixed by means of a film, c. the workpieces are joined in a gap-free manner, wherein the step a. and the step b. can be interchanged.

16 Claims, 5 Drawing Sheets

(51) Int. Cl.
  *B23K 26/24* (2014.01)
  *B23K 26/00* (2014.01)
  *F16B 5/08* (2006.01)
  *F16B 11/00* (2006.01)
  *B23K 26/244* (2014.01)
  *B23K 103/10* (2006.01)
  *B23K 103/14* (2006.01)

(52) U.S. Cl.
  CPC ............... *B23K 37/04* (2013.01); *F16B 5/08* (2013.01); *F16B 11/006* (2013.01); *B23K 2103/10* (2018.08); *B23K 2103/14* (2018.08)

(58) Field of Classification Search
  USPC ..... 219/121.6, 121.63, 121.64, 121.85, 60.2, 219/61
  See application file for complete search history.

(56) References Cited

U.S. PATENT DOCUMENTS

| | | | |
|---|---|---|---|
| 2008/0035615 A1* | 2/2008 | Li ........................... | B23K 26/32 219/121.63 |
| 2017/0016086 A1* | 1/2017 | Sanadres .............. | C09D 167/02 |

FOREIGN PATENT DOCUMENTS

| | | |
|---|---|---|
| DE | 092 24 021 | 6/1999 |
| DE | 197 57 245 | 6/1999 |
| DE | 696 03 208 | 11/1999 |
| DE | 10 2008 027 164 | 1/2009 |
| DE | 10 2011 118 994 | 5/2013 |
| DE | 20 2012 102 188 | 9/2013 |
| DE | 10 2012 216 664 | 3/2014 |
| EP | 0 724 927 | 8/1996 |
| JP | 06246475 A * | 9/1994 |
| JP | 10263868 A * | 10/1998 |

OTHER PUBLICATIONS

Machine translation of DE 4404492, Published in 1995.*
German to English machine translation of DE 102012216664, Published in 2014.*
German to English machine translation of DE 69603208, Published in 1999.*
Uwe Relsgen, et al.; Application of Pressure-Sensitive Adhesive Systems in Laser-Beam Welding of Lap Joints; Paper 409; 2009; pp. 213-218.

* cited by examiner

BEAM WELDING METHOD WITH GEOMETRIC FIXING BY A FILM

BACKGROUND OF THE INVENTION

Laser beam welding methods are known from the prior art as joining methods, in which the energy input into the workpieces or components to be joined is produced by means of a laser. The method is utilized for welding components, which must be joined at a high welding rate, with a welding seam having a narrow and slender shape, and with low thermal distortion. Laser welding, or laser beam welding, is generally carried out adding a filler material.

Force-locking clamping or fixing devices are used for fixing the components. There are so-called universal clamping devices and clamping techniques, which are adapted to the component and are used in the construction of prototypes. These are very expensive and complicated.

According to the prior art, in the case of thin-walled components, one attempts to achieve continuously gap-free fixation of the parts, which are to be welded together, to one another by means of mechanical clamping devices such as hold-down devices, hold-down rails, and the like, or by means of a vacuum clamping device, for example, by suctioning the components onto a clamping surface. In this case, it is disadvantageous that a minimum distance between the clamping elements and the joining zone must always be maintained, in order to keep the joining zone accessible for the joining process.

Furthermore, it is disadvantageous that these component geometry-dependent or adjustable mechanical, pneumatic or hydraulically acting clamping devices require a great deal of technical complexity in production and are very expensive, in particular when joining complex, three-dimensional contours, because highly complex and very expensive fixing devices must be produced for this purpose.

The welding of metallic foils and non-metallic, weldable materials onto thick-walled components or to one another therefore disadvantageously requires a great deal of effort in order to fix the components. This effort becomes even greater when 2- or 3-dimensionally curved surfaces are to be joined.

A hybrid laser beam welding method is known from Reisgen et al. (Uwe Reisgen, Klaus Dilger, Simon Olschok, Nikolaus Wagner, 2009. Application of pressure-sensitive adhesive systems in laser-beam-welding of lap joints. 28th International Congress on Applications of Lasers & Electro-Optics (ICALEO). Orlando, Fla., USA.). In this form of welding, a pressure-sensitive adhesive was additionally inserted between the two sheets. The method consists of a combination of placing pressure-sensitive adhesive strips between the two sheets, which are disposed in a lap joint, and a subsequent laser-beam welding next to the pressure-sensitive adhesive strips. In this case, the strip was adhered first to the surface of one component. Next, the second component was placed onto the first component in a lap joint, and was fixed by means of the adhesive film disposed between the components. Welding was then performed. The sheets are geometrically fixed by means of the immediate adhesion of the double-sided adhesive strips. By way of suitably selecting the adhesive strip-thickness, a defined gap is established between the sheets, which allows for a permissible degassing of zinc vapor through the adhesive strips.

It is also disadvantageous that this technology does not permit component surfaces to be flexibly fixed to one another and to be joined in a gap-free manner.

SUMMARY OF THE INVENTION

One object of the invention is, therefore, to provide a method, by means of which workpieces such as, e.g., metallic or non-metallic foils, can be easily joined to one another in a gap-free manner. The object of the invention, in particular, is to provide a laser beam welding method, by means of which thin foils or sheets can be joined to themselves or to other workpieces in a gap-free manner.

Expensive and time-consuming clamping devices and methods shall be dispensed with, in particular when the object is to create three-dimensional geometries.

ACHIEVING THE OBJECT

The object is achieved by the method. Advantageous embodiments will become apparent from the dependent claims related thereto.

DESCRIPTION OF THE INVENTION

The method for the gap-free joining of two workpieces is achieved by the steps of:
a. bringing the workpieces to be joined into contact with one another so that a joining point is formed;
b. geometrically fixing the joining point by means of a film; and
c. joining the workpieces to one another.

A joining point is formed by moving two workpieces toward one another and bringing them into contact with one another until these workpieces overlap or form an I-joint. Workpieces situated in an I-joint can have direct physical contact to one another, although this is not necessary. "Bring into contact with one another" means, in this sense, that the workpieces are brought into contact with one another close enough to ensure that a joining point is formed between the workpieces, and that a joining method having potential for success can be used for connecting the workpieces.

After step c., the film can be removed from the surface of the workpieces.

At least two workpieces to be connected to one another, such as, for example, sheets, foils, and the like, are joined.

The term "workpiece" further includes, in particular but not exclusively, metallic foils and sheets, and non-metallic workpieces, provided these are joined using a joining method according to the invention. The expression "bring workpieces into contact with one another" optionally means, in the sense of the invention, that the joining point can be formed from two ends of a single workpiece, which can be handled in a mechanically flexible manner, such as, for example, a foil. In the case of a thin foil, this thin foil can be rolled, within the meaning of the invention, for example, to form a tube, and so two ends of the same foil abut one another (an I-joint) or overlap. As a result, the joining point is formed from two surfaces of a single workpiece, and is fixed.

According to the invention, the joining point between the two workpieces is fixed on the particular surfaces of the workpieces. According to the invention, there is no film or fixing means disposed between the workpieces, as in the prior art.

Optionally, step a. and step b. can be interchanged.

If step b. takes place before step a., the surface of a first workpiece, which forms a joining point, is initially fixed, and then at least one second workpiece is brought into contact with the first workpiece and is fixed by means of the film. For this purpose, it is conceivable and, of course, also possible, to initially provide one of the workpieces with a film at the margin of the surface thereof and to then carry out step a. The film is then initially fastened in an overlapping manner onto one of the workpieces and, then, the second workpiece is brought into contact with the first workpiece and is fixed with the free part of the adhesive film. In this way, further workpieces can be brought into contact with one another in a multi-layer joint.

There are, therefore, various approaches for bringing the workpieces into contact with one another.

The workpieces are brought into contact with one another in an overlapping manner. One workpiece then overlaps the other workpiece, preferably at the edge, and so one workpiece, at the edge, forms the upper workpiece, as it were, and one workpiece forms the corresponding lower workpiece. The film is disposed on the surface of the workpieces and geometrically fixes the joining point, and so the workpieces remain in the intended shape thereof during the joining process.

The joining point is fixed by means of the film in the area of overlap, which is to say, on the surface of the workpieces. There is no film between the workpieces, as in the prior art, but rather only on the surface of the workpieces.

Particularly simple fixation of the workpieces that are to be joined to one another is thereby advantageously ensured. Advantageously, there is no film or fixing means between the workpieces, and so this is a gap-free joining method. Particularly advantageously, this measure makes it possible for a gap-free joining method to be used, and the film can also be removed, if necessary. Depending on the width of the area of overlap, the material of one of the two workpieces is no longer available as usable area for subsequent uses.

In one further embodiment of the invention, the workpieces are, therefore, brought into contact with one another at a joint, and the joining point (I-joint) is formed. All the material of both workpieces is then available as usable area for subsequent uses. The joining point formed between the workpieces is formed at the joint of the two workpieces, which are in contact with one another, which is to say, over the end faces of the workpieces, for example, sheets. The workpieces can be present so as to be disposed, for example, both in the same plane. The workpieces then lie flat next to one another, as it were, and the film is disposed on the surface of the workpieces for the geometric fixation of the joining point. The workpieces can also be present so as to be angled with respect to one another, and the workpieces then lie, for example, at a right angle to one another. Other geometries are possible, of course, within the scope of the workpieces used, provided the fixing film has a sufficient adhesive force. For example, tube cross sections of any type can be produced, such as rectangular tubes, round tubes, and the like. "At the joint" means that the surfaces of the workpiece or the workpieces to be joined come into contact with one another only at the end faces thereof. In this case, there is no overlap between two or more workpieces. In this case, there is also no lower or upper surface of a workpiece between at least two of the joined workpieces; instead, the two workpieces to be joined lie either flat in the same plane or at an angle with respect to one another. In this case as well, a gap-free joining method is advantageously achieved, since the film for fixation is present only on the surface of the workpieces, but not between the workpieces.

It is also possible to bring at least two workpieces, such as, for example, sheets, into contact with one another, parallel to one another, and to fix these around the corners thereof, as it were, by means of the film.

One further embodiment relates to the design of a tube. This is formed, either in the area of overlap or at a joint, from a single workpiece, which can be handled in a mechanically flexible manner, such as, for example, a metallic foil.

The fixation of the joining point by means of a film is therefore possible in various ways. It is, therefore, advantageously possible to only partially fix the workpieces in the area of the joining point, which is to say, sequentially using at least one short piece of film. Film, which is the fixing means, is therefore advantageously saved, while the geometric shape of the joining point is retained. Furthermore, as an advantageous result of this measure, any type of joining method can be selected and other joining methods can be used in addition to laser beam welding methods. As is known, some films have an insulating property, for example, Tesafilm®. Some joining methods may therefore not be usable at the fixed areas of the joining point, for example, if it should not be possible to use electron beam welding there. Nonetheless, experiments have shown, in these cases as well, that the kinetic energy of the electrons appears to be sufficient for successfully utilizing the joining method.

An overview of the films, the type and manner of the fixation, which is to say, partial or complete fixation, and the joining methods used is provided in the table. These are not to be considered limiting, but rather are provided as examples of particularly relevant methods.

| Film/Fixation | Joining method |
| --- | --- |
| Adhesive film or adhesion film (transparent, insulating) The entire joining point is fixed. | Laser beam welding method on the entire joining point. Other joining methods, if necessary, such as, for example, electron beam welding. |
| Adhesive film or adhesion film (transparent, insulating) Only a portion of the joining point is fixed. | Laser beam welding method on the entire joining point; electron beam welding, microplasma welding, arc welding, etc., at the non-fixed points of the joining point |
| Adhesive film or adhesion film (non-transparent, insulating) Only a portion of the joining point is fixed. | Electron beam welding, microplasma welding, arc welding on the entire joining point |
| Adhesive film or adhesion film (non-transparent, insulating) Only a portion of the joining point is fixed. | Electron beam welding, microplasma welding, arc welding on the entire joining point; laser beam welding process at the non-fixed points of the joining point |

It is possible to advantageously use an adhesion film instead of a transparent and insulating adhesive film, such as for example, Tesafilm®. As indicated in the table, this provides advantages for some joining methods.

It is also possible, in particular, that the non-transparent films according to the two last rows in the table are locally removed by means of the process heat of the joining method, for example, by vaporization.

Particularly advantageously, however, the joining point is fixed by means of a transparent adhesive film. Within the scope of the invention, it was recognized that a transparent adhesive film, such as, for example, Tesafilm®, does not adversely affect the properties of a laser beam. The laser beam first passes through the Tesafilm® or any other optically transparent films without this being influenced and joins the workpieces to one another in a gap-free manner at the joining point.

The laser can be used particularly advantageously in combination with the adhesive film fixation, since the optically clear, transparent foil or the film is passed through by the laser beam without being influenced. The energy input by means of welding takes place in this case only on the optically non-transparent areas of the workpieces to be joined that lie underneath the fixing film. In the case of a low energy per unit length of weld, the film remains virtually uninfluenced even after the joining on the component surface. If a greater amount of heat is introduced, the foil advantageously vaporizes when the material-dependent vaporization temperature is exceeded, due to the resultant heat from the welding process. An adhesion film can be very easily removed after the joining, but has a lower local fixing force.

Pressure-sensitive films require tensioning around the corner by redirecting the force. The pressure-sensitive films can only be loaded under tension. Transparent films on a roll, such as DeCeFix®, can also be used.

An adhesive film, however, fixes directly at the joining point, but may need to be removed using a solvent, if the components to be welded have very thin walls and, therefore, are unstable.

Ultimately, fixation of workpieces is also particularly advantageously successful in the case of the thinnest sheets and foils that were present at the time of the patent application. For example, metallic foils and sheets having a thickness of only 0.005 mm to 5 mm have already been joined to one another. The workpieces can consist, for example, of aluminum or beryllium or titanium. Other metals are also possible.

Other non-metallic materials, such as, for example, plastics, which are to be joined by means of a laser beam, for example, have already been joined with the aid of transparent adhesive film or adhesion film for processing by means of joining processes such as, primarily, laser beam welding, since, in this case, the laser beam passes through the optically transparent film and fuses the workpieces.

Non-transparent adhesive and adhesion films have also already been used with electron beam welding and microplasma welding and, if necessary, also with an arc welding process, in order to join workpieces according to the invention. Laser beam welding methods cannot be used in the area of the electrical insulation by a film that need not be optically transparent. On the other hand, the method according to the invention has been used to join foils, as workpieces, to one another, in which case a film is vaporized during the joining process before the beam or the arc or the plasma fuses the workpieces lying underneath. This means that all films and joining methods can be freely combined with one another.

In the case of thicker workpieces, in particular, having a minimum thickness of 500 μm, it is ensured that the joining zone is sufficiently heated.

In one particularly advantageous embodiment of the invention, a combination of laser beam welding methods with a joining point fixed on the surface using adhesive film or adhesion film is used. In this case, the laser beam first passes through the transparent film and then strikes the joining point. Thus, no film is located between the workpieces, and so a gap-free joining is carried out.

Particularly advantageously, metallic and non-metallic foils and sheets having a thickness of 0.005 mm to 5 mm have already been joined to one another by means of the method according to the invention. Of course, the workpieces can have any thickness, which is to say, thicknesses of 0.005, 0.006, 0.007, . . . 4.997, 4.998, 4.999 to approximately 5 mm. No limitations have been placed on the dimensions of the width and height of the sheets and foils per se.

In one embodiment of the invention, the fixing and clamping problems associated with large-area workpieces that are common in the prior art were eliminated, and so force-locking fixation can be provided as an alternative to the conventional clamping technique, for the first time.

It is understood that the method according to the invention can be used, in particular, in the construction of prototypes in the case of changeable component geometries.

Furthermore, the workpieces can also be disposed on substrates and fixed by means of film, in which case the substrate transfers the shape thereof to the workpieces.

Workpieces produced using the method according to the invention consist, in particular, of a foil, in which case the foil is present so as to be joined to itself in a gap-free manner, for example, as a thin tube. These can be used, for example, as scintillation tubes.

The workpiece according to the invention is a small tube, in the case of which the ends of the foil have been joined to one another in an overlapping manner or at a joint (I-joint). The length can be, for example, between 10-50 mm and can have a diameter of 1-10 mm.

The tubes according to the invention consist, therefore, in particular, of a thin-walled, in particular metallic aluminum or beryllium foil, which has a thickness between 0.005 mm to 5 mm. In this case, the workpieces or the foil can each have a thickness of 0.005, 0.006, 0.007, . . . 4.997, 4.998, 4.999 to approximately 5 mm, and can assume any intermediate value. No limitations have been placed on the dimensions of the width and height of the sheets and foils, per se. The foil has then been joined to itself in a gap-free manner.

The invention will be described in the following in greater detail with reference to exemplary embodiments and the attached figures, although this is not intended to limit the invention.

DETAILED DESCRIPTION OF THE PREFERRED EMBODIMENTS

Figure 1:
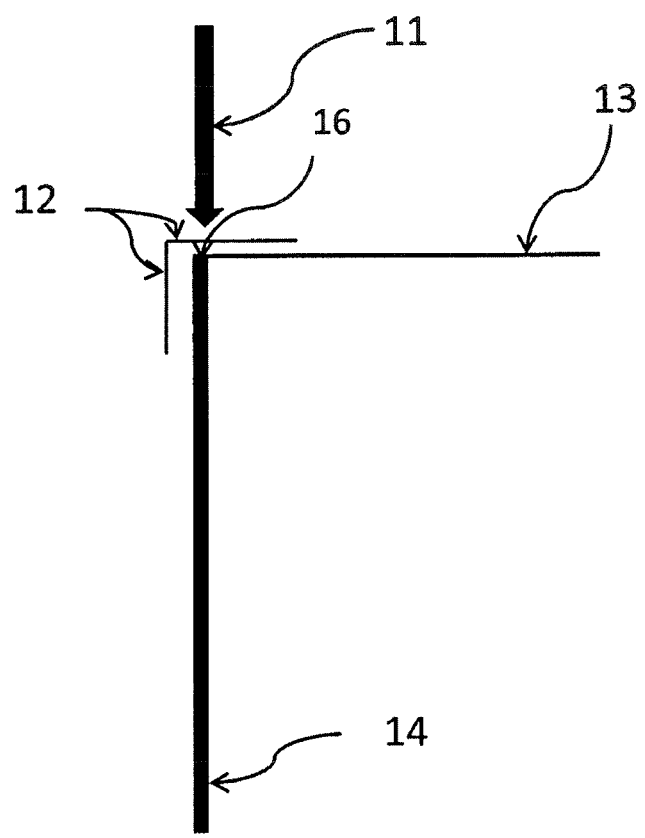
FIG. 1: shows an abutting fixation of two workpieces, which have different thicknesses, at a right angle to one another.

FIG. 1 shows a first exemplary embodiment of the joining method according to the invention. The cross section through a hollow body 14 at one of the sides thereof is shown. The hollow body consists of a 3 mm-thick sheet. The workpiece 13, which is a thin foil, has been placed thereon and the joining point 16 has been geometrically fixed around the corner thereof by means of film 12. The thin foil 13 is 0.5 mm thick. The base of the hollow body or the foil is 2.6×2.9 m. The foil and the hollow body are the workpieces to be joined.

The two workpieces having the reference characters 14 and 13 are brought into contact with one another in a first step. FIG. 1 shows the so-called corner joint, by means of which the two workpieces 13 and 14 have been brought into contact with one another. The workpiece 13 is a thin foil having the following dimensions: width×height×depth=2600×0.5×2900 mm. The hollow body 14 has the following dimensions: width×height×depth=2600×3×2900 mm. The two workpieces 13 and 14 are connected to one another at the joint, around the corner, by means of the film 12, along the entire joining point. The joining point 16 is disposed at the joint of the two workpieces 13 and 14 and is, therefore, geometrically fixed by means of the transparent adhesive film 12 along the entire length thereof. The sheet 14 can be referred to as a lower sheet and the sheet 13 can be referred to as an upper sheet. The two workpieces are fixed at a right angle to one another.

The workpieces are joined by means of a laser welding method or an electron beam method, a plasma-assisted welding method or an arc-assisted welding method, which is indicated here with reference character 11.

In the end, a very thin foil 13 is mechanically fixed to the thicker sheet 14 at a right angle by means of the film. The free ends or sides of the sheets 13, 14 can also have been fixed in this way, or can have been mechanically fixed using hold-down devices.

Second Exemplary Embodiment

In one first variant of FIG. 1, the adhesive film 12 is only partially disposed at the joining point, which, in this case, is the corner joint at workpieces 13 and 14. In the cross-sectional view shown in FIG. 1, the two workpieces 13 and 14 are fixed to one another along the entire length thereof by means of a multiplicity of short adhesive strips 12. For the rest, the joining method is identical to the first exemplary embodiment.

Third Exemplary Embodiment

Figure 2:
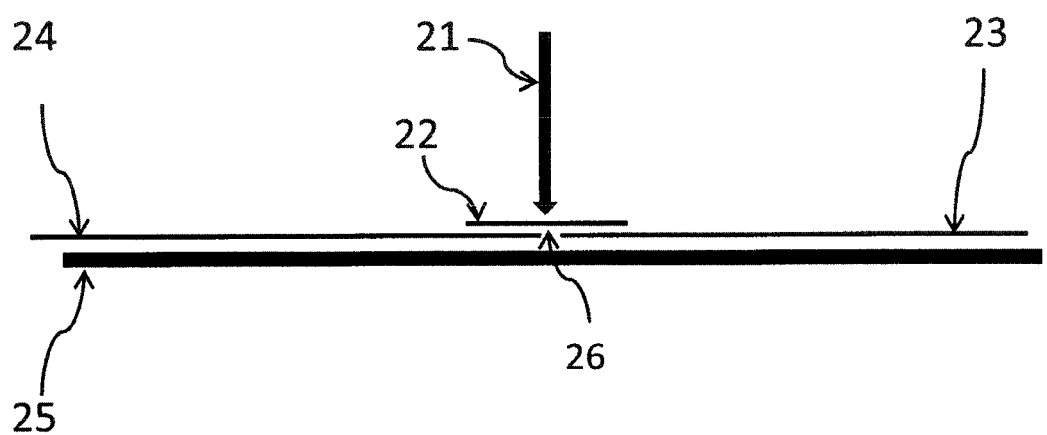
FIG. 2: shows an abutting fixation of two workpieces, which have the same thickness, in the same plane.

FIG. 2 shows a cross section of one exemplary embodiment of a so-called I-joint. The two thin sheets 23, 24 are identical. The sheets have the following dimensions: width×height×depth=2000×0.5×1500 mm. The two thin sheets 23, 24 are disposed on a steel sheet 25 made from copper, as the substrate. The joining point is present as a so-called I-joint at the point at which the two sheets 23, 24 abut one another. The joining point 26 has been fixed along the entire length by means of a transparent adhesive film 22. Optionally, the non-fixed areas of the sheets 23, 24 can also be fixed by means of foil, a foil, or mechanically by means of hold-down devices. A laser beam method, an electron beam method or a plasma-assisted joining method or an arc-assisted joining method can be used, in turn, as a joining method.

Fourth Exemplary Embodiment

As one variant of this exemplary embodiment, the adhesive film 22 is not disposed on the entire longitudinal side of the I-joint, but rather only sequentially. In this case, a further joining process, such as, for example, an electron beam welding process, a plasma-assisted welding process, or an arc-assisted welding process, can be used in the areas of the joining point which have not been fixed by means of adhesive film 22.

Fifth Exemplary Embodiment

Figure 3:
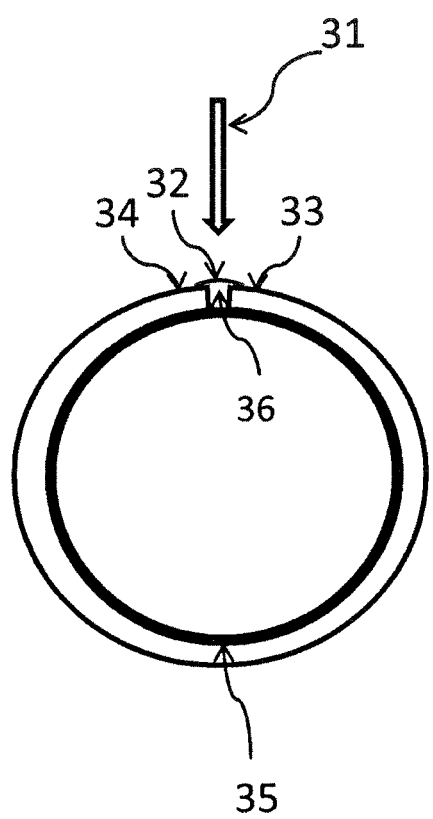
FIG. 3: shows an abutting fixation of two workpieces, which are made from a single foil, for producing a tube.

FIG. 3 shows a cross section through a thin foil 33, 34, which has been rolled onto a shaping substrate 35. The thin foil has the following dimensions in the flat plane: width×height (or thickness)×depth=300×0.01×53 mm. The foil has been wound onto a support cylinder 35 having sufficient stability for supporting the workpieces made from steel, or from a non-metallic material or another metallic material. The two ends 33, 34 form the workpieces to be joined and are disposed with respect to one another at the I-joint. There is no overlapping area. The two ends 33, 34 are also not in direct physical contact with one another or are directly disposed with respect to one another in such a way that the ends just touch one another. The resultant joining point 36 is fixed by means of a transparent adhesive film 32 or, generally speaking, a fixing foil. Instead of a support cylinder, a support tube 35 can also be used. The workpieces 33 and 34 to be joined, which are formed from a single foil in this case, preferably abut one another at the end faces thereof in a seamless manner. This form is referred to as a so-called I-joint.

A laser beam welding method, or an electron beam welding method or a plasma-assisted or arc-assisted welding method is preferably used as the joining method. Complete fusion across the entire thickness of the foil is possible only when a groove is present in the support tube 35 underneath the joining point. In this exemplary embodiment, the groove and the joining point are identical and are labeled with reference character 36. Otherwise, welding-in, which is to say, connecting of the foil to the support tube, occurs.

Ultimately, a very thin tube, preferably made from aluminum foil or beryllium foil, is obtained. This can be used, for example, as a scintillation chamber for particle accelerators.

Figure 4:
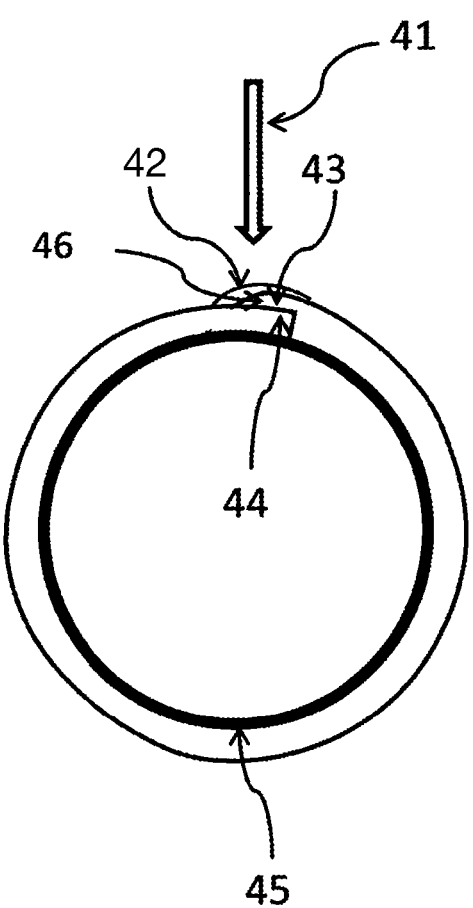
FIG. 4: shows a lap fixation of two workpieces, which are made from a single foil, for producing a tube.

FIG. 4 shows, as does FIG. 3, one exemplary embodiment for producing thin small tubes, in which, in contrast to FIG. 3, the free ends 43, 44 are disposed in a lap joint. This means that the free end 43 of the foil overlaps the free end 44 at the joining point 46. This joining point 46 is mechanically fixed by means of a fixing foil or an adhesive foil 42, which is transparent, across the entire longitudinal side thereof.

The joining method preferably consists of a laser beam welding method, or an electron beam method, a plasma-assisted welding method, or an arc-assisted welding method.

The thin sheet or the foil 43, 44 is wound onto the support tube or support cylinder 45 as described above, and so the sides 43, 44 to be welded overlap. The complete fusion of the upper part 43 of the foil into the lower foil 42 takes place at the lap joint or at the fillet (special case: fillet weld at the lap joint).

Thin-walled tubes made from aluminum or beryllium foil, which is 0.015 mm to 0.005 mm thick, have already been produced in this way. These small tubes have been successfully tested as scintillation chambers in accelerators.

Sixth Exemplary Embodiment

Figure 5:
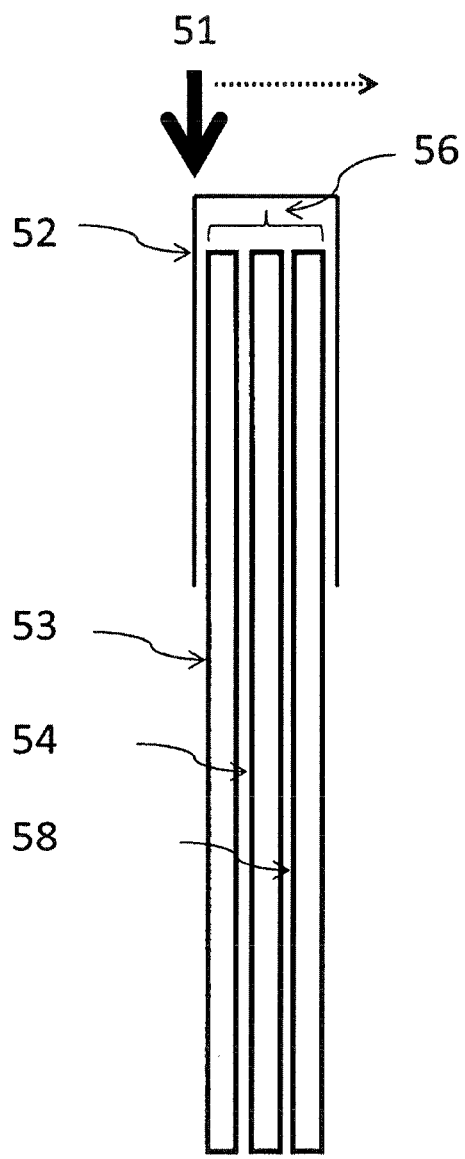
FIG. 5: shows joining of three sheets around the corners thereof.

FIG. 5 shows a cross section of a three-sheet connection formed from the sheets 53, 54 and 58. The three sheets have the following dimensions: width×height×depth=1200×0.5×1200 mm. The material consists of chromium nickel steel.

The sheets are fixed around the corners thereof by means of the film 52. The bracket indicates the joining point 56. The laser 51 is moved over the joining point, as indicated by the dotted line, for an I-seam on the multi-layer joint and, therefore, joins the sheets to one another. The laser can also be moved perpendicular thereto in order to generate an edge weld without edge preparation.

Connections of this type are referred to as a multi-sheet connection formed from at least two sheets in a set-up. The sheets typically have a thickness of 0.1 to 2 mm and are usually joined to one another in up to four layers.

In FIGS. 1-5, the reference characters 16, 26, 36 and 46, 56 respectively indicate the location of the joining point.

The invention claimed is:

1. A method for joining two workpieces, comprising;
   a. bringing the two workpieces to be joined into contact with one another, wherein a point of contact between the workpieces is a joining point,
   b. geometrically fixing a relative position of the two workpieces with a film so that the joining point of the two workpieces is fixed relative to the two workpieces for a subsequent joining step, said film being disposed on a surface of each of said two workpieces so as to cover and be in contact with a portion of each of said two workpieces without being situated between the two workpieces, said film covering said joining point without being situated in the joining point,
   c. joining the two workpieces by welding the point of contact using a beam transmitted through said film so that the workpieces are joined at the joining point in a gap-free manner, wherein said joined joining point consists of material limited to either one or both of said two workpieces, and
   d. during said joining, vaporizing the film with heat from said welding so as to remove all or a portion of the film.

2. The method according to claim 1, wherein the workpieces are brought into contact with one another in an overlapping manner.

3. The method according to claim 1, wherein the workpieces are brought into contact with one another at a joint.

4. The method according to claim 1, wherein said film is a transparent film.

5. The method according to claim 1, wherein said film is an adhesive film.

6. The method according to claim 1, wherein said joining comprises joining the workpieces to one another in a gap-free manner by welding the workpieces to one another with a laser beam.

7. The method according to claim 1, wherein said two workpieces comprise either one or both of a foil and a sheet, each one of said either one or both of said foil and said sheet having a thickness of 0.005 mm to 5 mm.

8. The method according to claim 1, wherein said two workpieces comprise a foil made from aluminum, beryllium or titanium.

9. The method according to claim 1, wherein said two workpieces comprise two ends of one common piece, so that a first workpiece of said two workpieces is formed by a first end of said one common piece and a second workpiece of said two workpieces is formed by a second end of said one common piece, said one common piece being a thin sheet or a foil.

10. The method according to claim 1, wherein said two workpieces comprise a first workpiece and a second workpiece, and wherein the step b. is carried out before the step a., by way of the film being placed onto a section of the first workpiece, wherein the section is intended to form the joining point, and is then brought into contact with the second workpiece and fixed, said first and second workpiece being two ends of a common workpiece or being two separate workpieces.

11. The method according to claim 1, wherein before step a., the workpieces are disposed on a shaping substrate, and wherein the geometric shape of the substrate is transferred to the workpieces conforming to the substrate.

12. The method according to claim 11, wherein a cylindrical shape of the substrate is for producing a tube.

13. The method according to claim 1, wherein the joined workpieces are removed from the substrate.

14. The method according claim 1, wherein energy is input into the joining point, by means of which the workpieces are non-detachably joined to the substrate.

15. The method for joining two workpieces according to claim 1 to form a scintillation tube, in which said joining comprises;
   joining the workpieces to one another in a gap-free manner to form the scintillation tube made from a thin-walled, metallic foil having a thickness of 0.005 to 5 mm.

16. The method for joining two workpieces according to claim 1, further comprising removing with a solvent any of the film that remains after said welding.

* * * * *